(12) United States Patent
Nogi (10) Patent No.: US 11,514,384 B2
(45) Date of Patent: Nov. 29, 2022

(54) PRODUCTIVITY IMPROVEMENT SUPPORT SYSTEM AND PRODUCTIVITY IMPROVEMENT SUPPORT METHOD

(71) Applicant: Hitachi, Ltd., Tokyo (JP)

(72) Inventor: Keita Nogi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/215,201

(22) Filed: Mar. 29, 2021

(65) Prior Publication Data

US 2021/0350296 A1  Nov. 11, 2021

(30) Foreign Application Priority Data

May 8, 2020 (JP) .............................. JP2020-082437

(51) Int. Cl.
*G06Q 10/06* (2012.01)
*G06Q 50/04* (2012.01)

(52) U.S. Cl.
CPC ... *G06Q 10/0635* (2013.01); *G06Q 10/06312* (2013.01); *G06Q 10/06395* (2013.01); *G06Q 50/04* (2013.01)

(58) Field of Classification Search
None
See application file for complete search history.

(56) References Cited

U.S. PATENT DOCUMENTS

| 2001/0027406 A1* | 10/2001 | Araki | G06Q 10/06398 705/7.16 |
| 2005/0131779 A1* | 6/2005 | Kitamura | G06Q 30/0202 700/106 |

(Continued)

FOREIGN PATENT DOCUMENTS

| EP | 1918885 B1 * 11/2017 | ............... G07C 3/00 |
| JP | 2015-103019 A  4/2015 | |

(Continued)

OTHER PUBLICATIONS

Kim, Sooyoung, Youngshin Park, and Chi-Hyuck Jun. "Performance evaluation of re-entrant manufacturing system with production loss using mean value analysis." Computers & Operations Research 33.5 (2006): 1308-1325. (Year: 2006).*

(Continued)

*Primary Examiner* — Brian M Epstein
*Assistant Examiner* — Derick J Holzmacher
(74) *Attorney, Agent, or Firm* — Mattingly & Malur, PC (57) ABSTRACT

Improvement of work is instructed based on an analysis result obtained by combining data having different timescales. A productivity improvement support system includes a time scale setting unit configured to, when 4M data having different time scales acquired from a target device contains data that satisfy a condition for detecting a state fluctuation, switch time scale of the 4M data to time scales according to a state fluctuation, a loss analysis calculation unit configured to analyze a production loss factor by using analysis model data in which the production loss factor of the target device when the condition is satisfied is determined, and a recommended work selection unit configured to select a recommended work when the production loss factor occurs from one or a plurality of recommended works by using recommended work data stored in association with the production loss factor.

8 Claims, 6 Drawing Sheets

(56) References Cited

U.S. PATENT DOCUMENTS

| | | | | |
|---|---|---|---|---|
| 2007/0219929 | A1* | 9/2007 | Steinbach | G06Q 10/06 700/96 |
| 2008/0010109 | A1* | 1/2008 | Ide | H04L 43/0817 705/7.12 |
| 2008/0103715 | A1* | 5/2008 | Tsuda | G07C 3/00 702/81 |
| 2010/0010879 | A1* | 1/2010 | Roebke | G06Q 10/06393 705/7.39 |
| 2012/0078670 | A1* | 3/2012 | Yamamura | G05B 19/4184 705/7.11 |
| 2013/0282415 | A1* | 10/2013 | Saito | G06Q 10/06 705/7.11 |
| 2017/0207629 | A1* | 7/2017 | Seki | G06Q 10/0631 |
| 2018/0224836 | A1* | 8/2018 | Oka | G05B 19/418 |
| 2018/0259944 | A1* | 9/2018 | Oka | H05K 3/341 |
| 2018/0356804 | A1* | 12/2018 | Oka | G05B 19/418 |
| 2019/0339675 | A1* | 11/2019 | Maeda | G05B 19/4183 |
| 2020/0058081 | A1* | 2/2020 | Saneyoshi | G06Q 10/06 |

FOREIGN PATENT DOCUMENTS

| | | | | |
|---|---|---|---|---|
| WO | WO-0140886 A1 | * | 6/2001 | G05B 19/41865 |
| WO | WO-2012073536 A1 | * | 6/2012 | G05B 19/418 |
| WO | WO-2016056287 A1 | * | 4/2016 | G05B 15/02 |

OTHER PUBLICATIONS

Pomorski, Tom. "Managing overall equipment effectiveness [OEE] to optimize factory performance." 1997 IEEE International Symposium on Semiconductor Manufacturing Conference Proceedings (Cat. No. 97CH36023). IEEE, 1997. (Year: 1997).*

Rastegari, Ali, and Marcus Bengtsson. "Cost effectiveness of condition based maintenance in manufacturing." 2015 Annual Reliability and Maintainability Symposium (RAMS). IEEE, 2015. (Year: 2015).*

* cited by examiner

Machine (1411):

| EQUIPMENT ID | START TIME | END TIME | OPERATING STATUS | EXECUTION RECIPE | ... | CUMULATIVE OPERATING TIME | CURRENT VALUE | ... |
|---|---|---|---|---|---|---|---|---|
| M0001 | 2019/11/01 13:01 | 2019/11/01 13:15 | STOP | - | ... | 1.43 | 0 | ... |
| M0002 | 2019/11/01 13:15 | 2019/11/01 13:24 | PROCESS | W0002 | ... | 1.45 | 2.3 | ... |
| M0003 | 2019/11/01 13:25 | 2019/11/01 13:33 | ALARM (POWER) | - | ... | 1.66 | 1.5 | ... |

Man (1412):

| WORKER ID | START TIME | END TIME | WORKING AREA | WORKING TIME | CNC OPERATION | ... |
|---|---|---|---|---|---|---|
| W0001 | 2019/11/02 14:03 | 2019/11/02 14:33 | AREA 3 | 3.5 | ABSENCE | ... |
| W0002 | 2019/11/02 15:15 | 2019/11/02 15:34 | AREA 4 | 4.2 | ABSENCE | ... |
| W0003 | 2019/11/02 16:10 | 2019/11/02 17:22 | AREA 1 | 2.3 | PRESENCE | ... |

Material (1413):

| PRODUCT ID | ID READING | ID READING TIME | PROCESS TRANSPORT | TRANSPORT START TIME | TRANSPORT END TIME | QUALITY | TEMPERATURE |
|---|---|---|---|---|---|---|---|
| P0001 | FINISHED | 2019/11/03 11:40 | FINISHED | 2019/11/02 14:20 | 2019/11/03 10:43 | GOOD | 32.1 |
| P0002 | FINISHED | 2019/11/03 13:20 | FINISHED | 2019/11/02 15:15 | 2019/11/03 12:15 | GOOD | 33.4 |
| P0003 | UNFINISHED | 2019/11/05 17:15 | UNFINISHED | 2019/11/02 16:10 | 2019/11/04 17:10 | BAD | 31.3 |

Method (1414):

| MethodID | RECIPE ID | WORK INSTRUCTION No | WORK START TIME | WORK END TIME | ... |
|---|---|---|---|---|---|
| W0001 | R001 | O10001 | 2019/11/02 14:20 | 2019/11/02 14:33 | ... |
| W0002 | R002 | O10021 | 2019/11/02 16:10 | 2019/11/02 17:34 | ... |
| W0003 | R003 | O20003 | 2019/11/02 16:11 | 2019/11/02 17:22 | ... |

| GROUP ID | START TIME | END TIME | DATA GROUP | DATA CONTENT | TIME GRANULARITY |
|---|---|---|---|---|---|
| G0001 | 2019/11/01 13:01 | 2019/11/01 13:15 | M0001 | OPERATING STATUS | ms |
| | | | M0003 | CURRENT VALUE | ms |
| G0002 | 2019/11/01 13:25 | 2019/11/01 13:33 | P0001 | COORDINATE | s |
| | | | M0004 | CURRENT VALUE | s |
| | | | W0003 | OPERATION CONTENT | s |

| LOSS ID | PRODUCTION LOSS FACTOR | Man | Machine | Robot | Material | Method |
|---|---|---|---|---|---|---|
| L0001 | WAITING FOR ALARM DUE TO WORKER | ABSENCE | STOP | STANDBY STATE | WITH | W0001 |
| L0002 | ROBOT STOP DUE TO ARM OVERLOAD | * | STOP | CURRENT VALUE > 0.5 | GOOD | W0002 |
| L0003 | PROCESSING STOP DUE TO WORK NOT ARRIVING | * | STOP | STANDBY STATE | WITHOUT | W0001 |

| EQUIPMENT ID | START TIME | END TIME | LOSS ID | PRODUCTION LOSS FACTOR |
|---|---|---|---|---|
| M0001 | 2019/11/01 13:01 | 2019/11/01 13:15 | L0001 | WAITING FOR ALARM DUE TO WORKER |
| M0002 | 2019/11/01 13:15 | 2019/11/01 13:24 | L0002 | ROBOT STOP DUE TO ARM OVERLOAD |
| M0003 | 2019/11/01 13:25 | 2019/11/01 13:33 | L0003 | PROCESSING STOP DUE TO WORK NOT ARRIVING |

[FIG. 7]

| LOSS ID | PRODUCTION LOSS FACTOR | RECOMMENDED WORK |
|---|---|---|
| L0001 | WAITING FOR ALARM DUE TO WORKER | ALARM RELEASE |
| L0002 | ROBOT STOP DUE TO ARM OVERLOAD | ARM POSITION ACCURACY ADJUSTMENT |
| L0003 | PROCESSING STOP DUE TO WORK NOT ARRIVING | REVIEW OF WORK INPUT PLAN |

PRODUCTIVITY IMPROVEMENT SUPPORT SYSTEM AND PRODUCTIVITY IMPROVEMENT SUPPORT METHOD

TECHNICAL FIELD

The present invention relates to a productivity improvement support system and a productivity improvement support method.

BACKGROUND ART

In the related art, there are various systems for analyzing a production system using a machine tool. For example, PTL 1 discloses a technique in which a log acquisition unit of a server device acquires an access log of a user, and a time scale setting unit sets each time scale, which is a unit for subdividing data when performing a predetermined data processing for each user, from a behavior pattern based on the access log acquired by the log acquisition unit and accumulated in a server storage unit.

CITATION LIST

Patent Literature

PTL 1: JP-A-2015-103019

SUMMARY OF INVENTION

Technical Problem

In productivity analysis using manufacturing data, a production status is estimated and a production loss factor is extracted from the combination of data at a certain time by matching a time series of each data contained in 4M data, which consists of, for example, Machine, Man, Material, and Method and shows indicators for controlling manufacturing quality. In order to determine the loss factor from the data obtained from robots and sensors, it is not possible to pick up data fluctuations (changes in a state) with a minute order, and therefore, it is necessary to analyze data fluctuations with a fine time scale such as an ms order. However, when data is always acquired and analyzed with a fine time scale, an amount of data and an amount of calculation become enormous, and it is practically impossible to calculate. Further, when it is no longer necessary to determine the loss factor, it is desirable to return to the original order and suppress an increase in the amount of data and the amount of calculation.

PTL 1 describes setting the time scale for each data, but does not describe combining and analyzing data having different time scales and instructing improvement of work based on an analysis result of the data having different time scales.

An object of one aspect of the invention is to provide a productivity improvement support system and a productivity improvement support method capable of instructing improvement of work based on an analysis result obtained by combining data having different time scales.

Solution to Problem

A productivity improvement support system according to one aspect of the invention includes: a time scale setting unit configured to, when 4M data having different time scales acquired from a target device contains data that satisfy a condition for detecting a state fluctuation, switch time scale of the 4M data to time scales according to a state fluctuation; a loss analysis calculation unit configured to analyze a production loss factor by using analysis model data in which the production loss factor of the target device when the condition is satisfied is determined; and a recommended work selection unit configured to select a recommended work when the production loss factor occurs from one or a plurality of recommended works by using recommended work data stored in association with the production loss factor.

Advantageous Effect

According to one aspect of the invention, it is possible to instruct improvement of work based on the analysis result obtained by combining data having different time scales.

DESCRIPTION OF EMBODIMENTS

Hereinafter, an embodiment of the invention will be described with reference to the drawings. The following description and drawings are examples for describing the invention, and are omitted and simplified as appropriate for clarification of the description. The invention can be implemented in various other forms. Unless otherwise limited, each constituent element may be singular or plural.

In order to facilitate understanding of the invention, a position, a size, a shape, a range, or the like of each constituent element shown in the drawings may not represent an actual position, size, shape, range, or the like. Therefore, the invention is not necessarily limited to the position, size, shape, range, and the like disclosed in the drawings.

In the following description, although various types of information may be described by expressions such as "table" and "list", the various types of information may be expressed by other data structures. "XX table", "XX list", and the like are referred to as "XX information" to indicate that information does not depend on a data structure. When identification information is described using expressions such as "identification information", "identifier", "name", "ID", and "number", the expressions may be replaced with each other.

When there are a plurality of constituent elements having a same or similar function, different subscripts may be attached to the same reference sign. However, when there is no need to distinguish the plurality of constituent elements, the subscripts may be omitted.

In the following description, a processing performed by executing a program may be described. However, the program is executed by a processor (for example, a central processing unit (CPU) or a graphics processing unit (GPU)) performing a predetermined processing using a storage resource (for example, a memory) and/or an interface device (for example, a communication port), or the like as appropriate, and therefore, a subject of the processing may be the processor. Similarly, the subject of the processing performed by executing the program may be a controller, device, system, computer, or node including a processor. The subject of the processing performed by executing the program may be a calculation unit, and may include a dedicated circuit (for example, a field-programmable gate array (FPGA) or an application specific integrated circuit (ASIC)) that performs a specific processing.

The program may be installed from a program source into a device such as a computer. The program source may be, for example, a program distribution server or a computer-readable storage medium. When the program source is the program distribution server, the program distribution server may include a processor and a storage resource that stores a program to be distributed, and the processor of the program distribution server may distribute the program to be distributed to another computer. Two or more programs may be implemented as one program, or one program may be implemented as two or more programs in the following description.

The following exemplifies a case where the productivity improvement support system and the productivity improvement support method according to the present embodiment are applied at a manufacturing site such as a factory or a manufacturing line, and the productivity improvement support system and the productivity improvement support method also can be applied to various production resources related to manufacturing such as equipment, systems, devices, and instrument used at sites other than these manufacturing sites.

Figure 1:
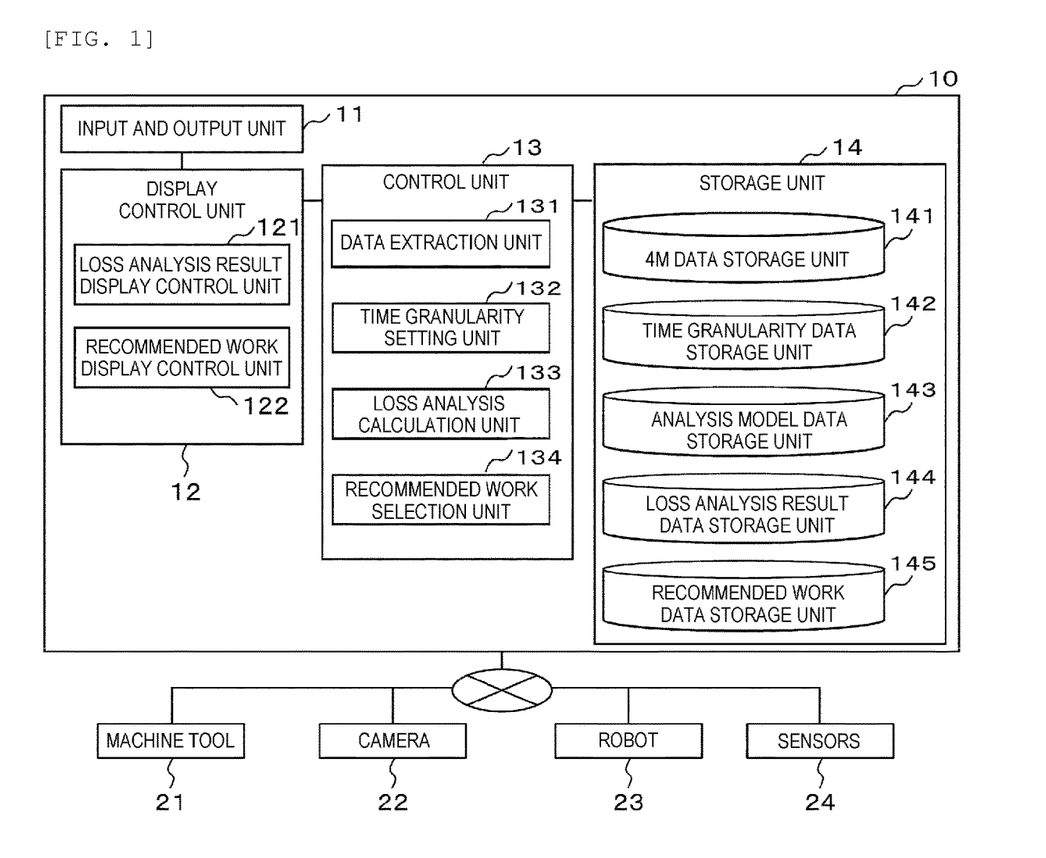
FIG. 1 is a diagram showing an example of a productivity improvement support system in an embodiment.

FIG. 1 shows an example of a productivity improvement support system 10 in the present embodiment. As shown in FIG. 1, the productivity improvement support system 10 includes an input and output unit 11, such as a keyboard, a display or a touch panel, that receives input of various information from a user, and displays a result of the various information processed by the system, a display control unit 12 that displays the result processed by the control unit 13 on a screen of the display, a control unit 13 that is a main body that executes various processes in the present system, and a storage unit 14 that stores various data used in the present system.

In addition, the display control unit 12 includes a loss analysis result display control unit 121 that displays a loss analysis result calculated by a loss analysis calculation unit 133, which will be described later, on the display screen, and a recommended work display control unit 122 that displays a recommended work calculated by a recommended work selection unit 134, which will be described later, on the display screen.

Further, the control unit 13 is configured by a server including a data extraction unit 131 that acquires 4M data from a target device that outputs 4M data, such as a machine tool 21, a camera 22, a robot 23, and a sensor 24 installed in a factory or a manufacturing line, and stores manufacturing record data to be described later in a 4M data storage unit 141, a time scale setting unit 132 that sets or switches a time scale of the 4M data extracted by the data extraction unit 131 when it is determined that a fluctuation of the acquired 4M data, that is, the state fluctuation in a process of producing the target device has occurred more than a certain level by using a time scale data 1421 to be described later, a loss analysis calculation unit 133 that analyzes a production loss factor of the target device that outputs the 4M data, in which the time scale is switched, by using an analysis model data 1431 to be described later, and a recommended work selection unit 134 that selects a work recommended according to the analysis result of the production loss.

Moreover, the storage unit 14 includes a 4M data storage unit 141 that stores the 4M data acquired and extracted from the target device, a time scale data storage unit 142 that stores the time scale set or switched by the time scale setting unit 131, an analysis model data storage unit 143 that defines a condition for detecting the production loss factor of the target device, a loss analysis result data storage unit 144 that stores the loss factor detected by the analysis model data 1431 described above, and a recommended work data storage unit 145 that defines a recommended work corresponding to the loss factor.

Figure 2:
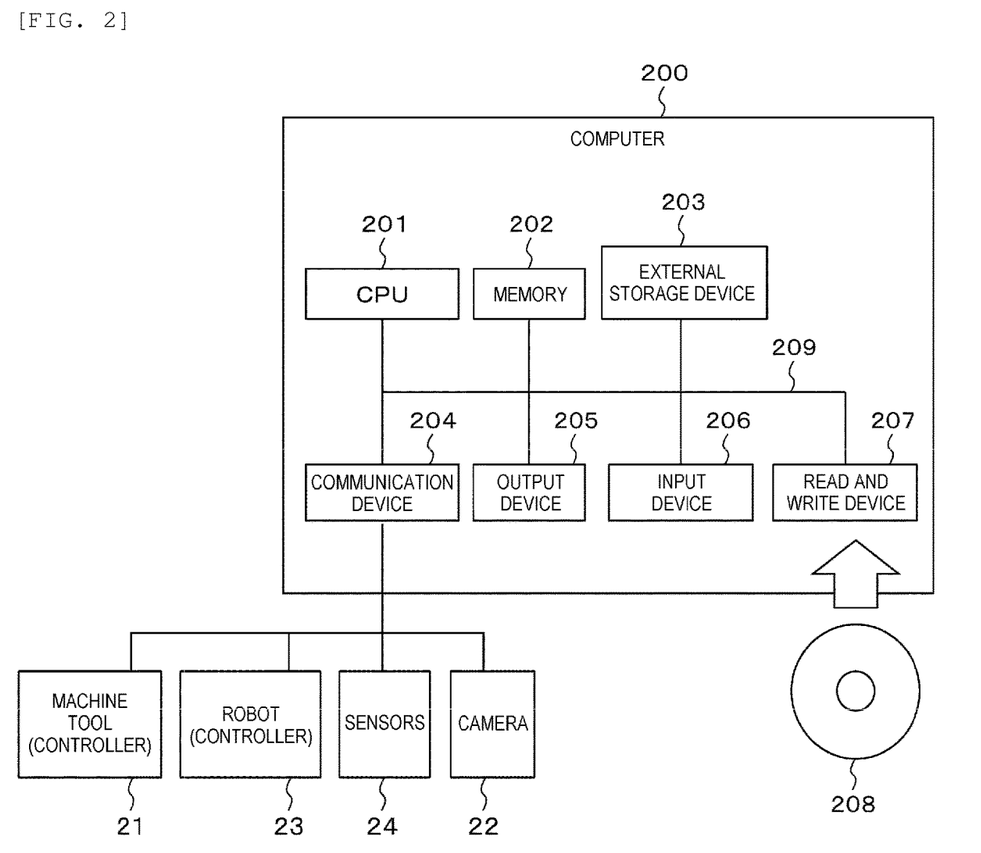
FIG. 2 is a schematic diagram of a server used in the present system.

As shown in FIG. 2 (a schematic diagram of a computer), the server shown above can be realized by a general computer 200 including a CPU 201, a memory 202, an external storage device 203 such as a hard disk drive (HDD), a read and write device 207 that reads and writes information of a portable storage medium 208 such as a compact disk (CD) or a digital versatile disk (DVD), an input device 206 such as a keyboard or a mouse, an output device 205 such as a display, a communication device 204 such as a network interface card (NIC) for connecting to a communication network, and internal communication lines 209 (referred to as system buses) such as system buses that connect these.

For example, each DB of the 4M data storage unit 141, the time scale data storage unit 142, the analysis model data storage unit 143, the loss analysis result data storage unit 144, the recommended work data storage unit 145 and the like stored in the server can be realized by the CPU 201 reading from the memory 202 or the external storage device 203 and using it. In addition, the data extraction unit 131, the time scale setting unit 132, the loss analysis calculation unit 133, and the recommended work selection unit 134 included in the server can be realized by the CPU 201 loading a predetermined program stored in the external storage device 203 into the memory 202 and executing the program. Further, the server may have the input and output unit 11 in which the CPU 201 can operate the input device 206 to realize an input function. Further, the server may have the input and output unit 11 in which the CPU 201 can operate the output device 205 to realize an output function. Further, the server may have a communication unit (not shown) in which the CPU 201 can operate the communication device 204 to realize a communication function. In the present embodiment, the data extraction unit 131 of the server has a function controlled by the communication unit described above. The data extraction unit 131 acquires the 4M data described above from the machine tool 21, the camera 22, the robot 23, and the sensors 24 via a network N.

Figure 3:
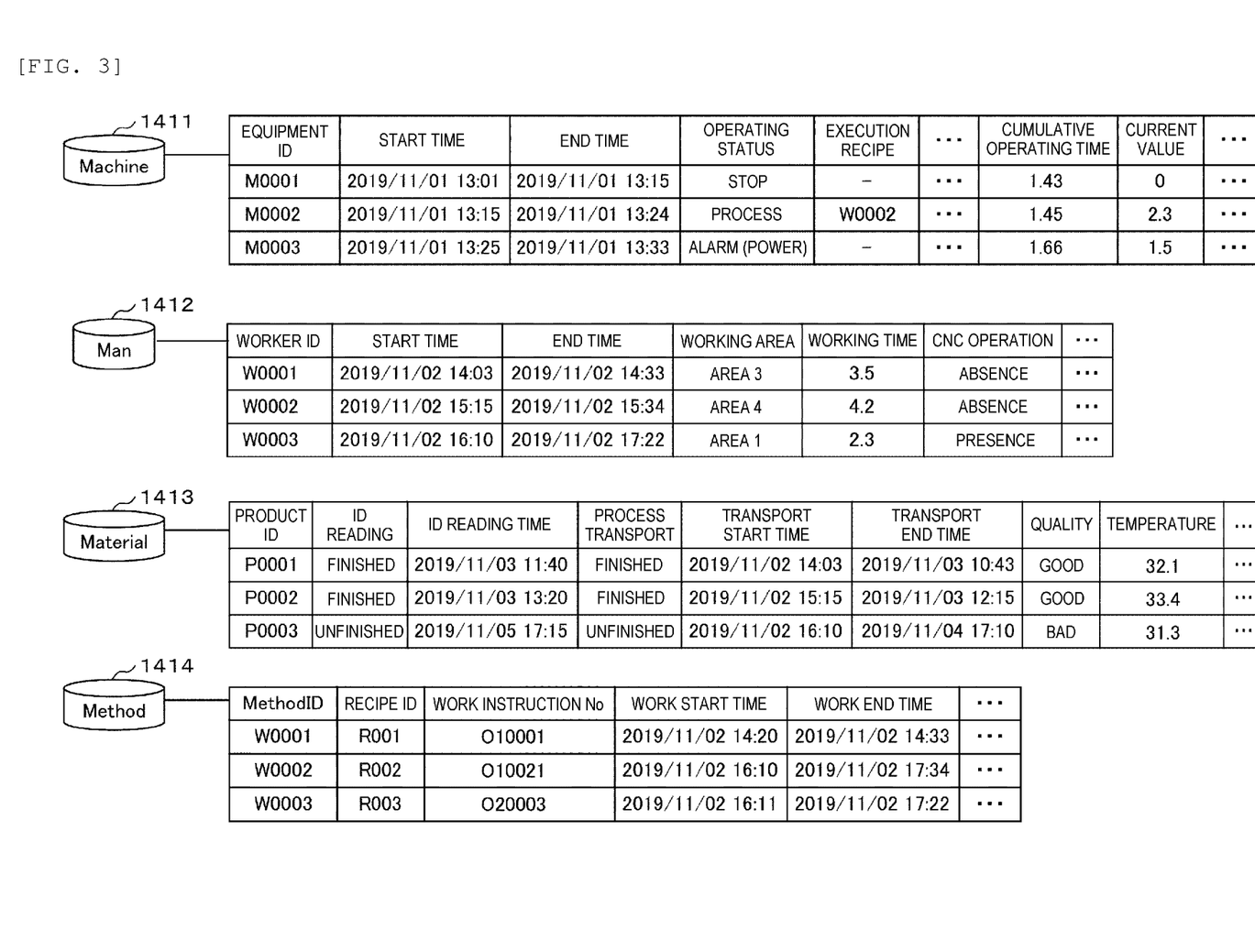
FIG. 3 is a diagram showing examples of data stored in a 4M data storage unit, a time scale data storage unit, an analysis model data storage unit, a loss analysis result data storage unit, and a recommended work data storage unit.

FIG. 3 is a diagram showing an example of the data stored in the 4M data storage unit 141, the time scale data storage unit 142, the analysis model data storage unit 143, the loss analysis result data storage unit 144, and the recommended work data storage unit 145 in the storage unit 14. FIG. 3 illustrates Machine data 1411 as an example of the data stored in the 4M data storage unit 141. FIG. 3 further illustrates Man data 1412 as an example of the data stored in the 4M data storage unit 141. FIG. 3 further illustrates Material data 1413 as an example of the data stored in the 4M data storage unit 141. FIG. 3 further illustrates Method data 1414 as an example of the data stored in the 4M data storage unit 141.

As shown in FIG. 3, the Machine data 1411 includes an equipment ID for identifying a target device that outputs the 4M data, a start time when the target device such as a machine tool identified by the equipment ID operates, an end time of the operation of the target device, an operating status of the target device, an execution recipe that shows a condition for the target device to operate, a past cumulative operating time of the target device, and a current value during the operation of the target device.

In addition, the Man data 1412 includes a worker ID, a start time when a worker such as a worker identified by the worker ID starts the operation, an end time when the worker finishes the operation, a working area and a working time of the worker, and a CNC operation indicating whether there is an operation on a controller of the target device.

Further, the Material data 1413 includes a product ID of a product manufactured by the equipment, an ID reading indicating a reading state of the product ID, an ID reading time, which is a time when the ID reading is performed, a process transport indicating a transport state of the product, a start time and an end time of the transport, and a quality and a temperature of the product.

Further, the Method data 1414 includes a Method ID for identifying the process, a recipe ID indicating a procedure of the process identified by the Method ID, a work instruction No indicating an order of the process, and a work start time and work end time of the process.

Figure 4:
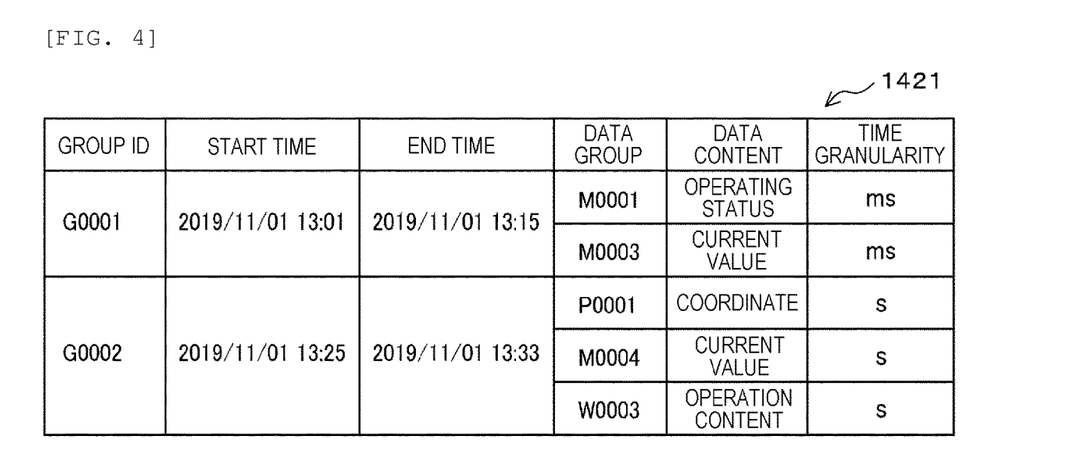
FIG. 4 is a diagram showing an example of time scale data stored in the time scale data storage unit.

FIG. 4 is a diagram showing an example of time scale data 1421 stored in the time scale data storage unit 142. The time scale data 1421 is data in which the time scale of the 4M data acquired from the target device is stored. As shown in FIG. 4, in the time scale data 1421, a group ID for identifying a group of time scale that is set or switched by the time scale setting unit 131, a start time when a target device such as a machine tool operates, an end time when the operation of the target device ends, a data group for identifying the data for each type of the 4M data, data content indicating the content of the data identified by the data group, and the time scale of the data identified by the data group are stored in association with each other. In FIG. 4, for example, a "current value" of a data group "M0003" belonging to a group ID "G0001" indicates that a time scale on an order of "ms" is set. This further indicates that a time when the current value detection starts is "13:01" on "Nov. 1, 2019", and a time when the current value detection ends is "13:15" on "Nov. 1, 2019". The time scale set in the time scale data 1421 is set by the time scale setting unit 132, and as will be described later, the time scale is switched when it is determined that the state fluctuation has occurred more than a certain level in a process of producing the target device.

Figure 5:
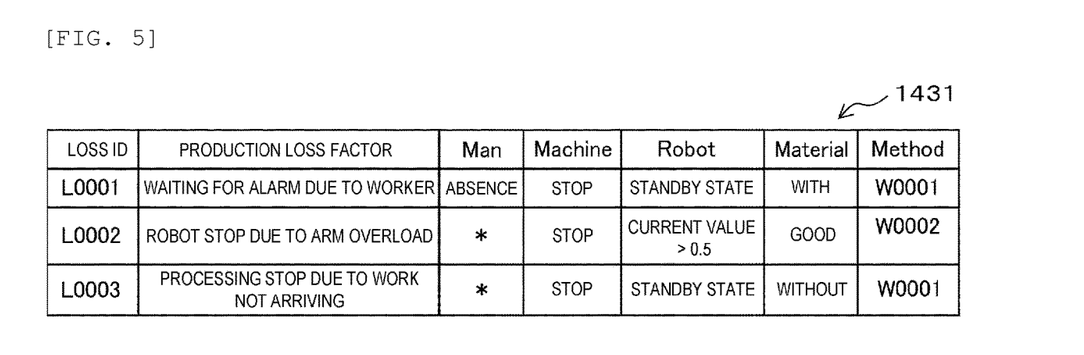
FIG. 5 is a diagram showing an example of analysis model data stored in the analysis model data storage unit.

FIG. 5 is a diagram showing an example of the analysis model data 1431 stored in the analysis model data storage unit 143. The analysis model data 1431 is data that defines conditions for detecting the state fluctuation in the process of producing the target device. As shown in FIG. 5, in the analysis model data 1431, a loss ID for identifying a production loss factor, a production loss factor identified by the loss ID, and the conditions for detecting the state fluctuation in the process of producing the target device that outputs 4M data are stored in association with each other. In FIG. 5, regarding the Machine among the 4M data, the conditions are set separately as robots and others. For example, the production loss factor identified by a loss ID "L0002" is "robot stop due to arm overload". The condition for detecting the production loss factor is that the Machine is in a stopped state, when the Material in Method "W0002" is "good" and it is detected that the current value of Robot exceeds 0.5, it is determined that the production loss factor is the "robot stop due to arm overload" described above. In addition, the state fluctuation is detected only when the production loss state is switched. For example, in FIG. 5, when the current value fluctuates from 0.1 to 0.3, the current value itself fluctuates, but the fluctuation in the production loss state is not detected.

Figure 6:
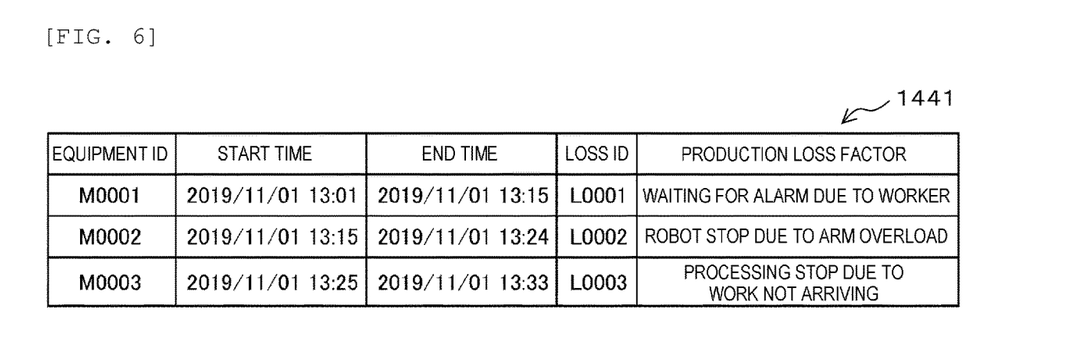
FIG. 6 is a diagram showing an example of loss analysis result data stored in the loss analysis result data storage unit.

FIG. 6 is a diagram showing an example of the loss analysis result data 1441 stored in the loss analysis result data storage unit 144. As shown in FIG. 6, in the loss analysis result data 1441, an equipment ID for identifying a target device that outputs the 4M data, a start time when a target device such as a machine tool identified by the equipment ID operates, an end time when the operation of the target device ends, a loss ID for identifying a production loss factor, and a production loss factor identified by the loss ID are stored in association with each other. FIG. 6 shows that, for example, in Machine (for example, Robot) identified by an equipment ID "M0002", a time when the current value detection starts is "13:01" on "Nov. 1, 2019", a time when the current value detection ends is "13:15" on "Nov. 1, 2019", and the production loss factor in which the state fluctuation has occurred in the detection is "robot stop due to arm overload" identified by the loss ID "L0002".

Figure 7:
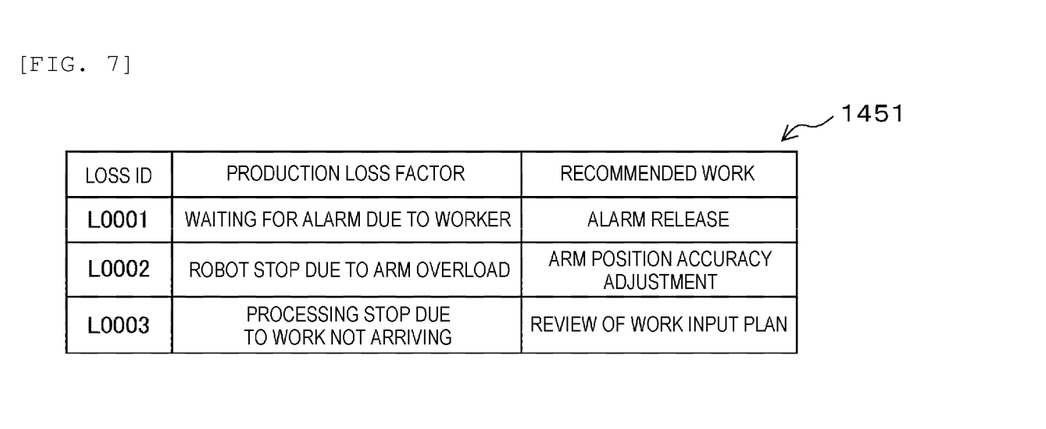
FIG. 7 is a diagram showing an example of recommended work data stored in the recommended work data storage unit.

FIG. 7 is a diagram showing an example of recommended work data 1451 stored in the recommended work data storage unit 145. As shown in FIG. 7, in the recommended work data 1451, a loss ID for identifying a production loss factor, a production loss factor identified by the loss ID, and a recommended work that indicates a recommended work for the production loss factor are stored in association with each other. FIG. 7 shows that for example, when the production loss factor of "robot stop due to arm overload" identified by the loss ID "L0002" occurs, the recommended work is "arm position accuracy adjustment".

Figure 8:
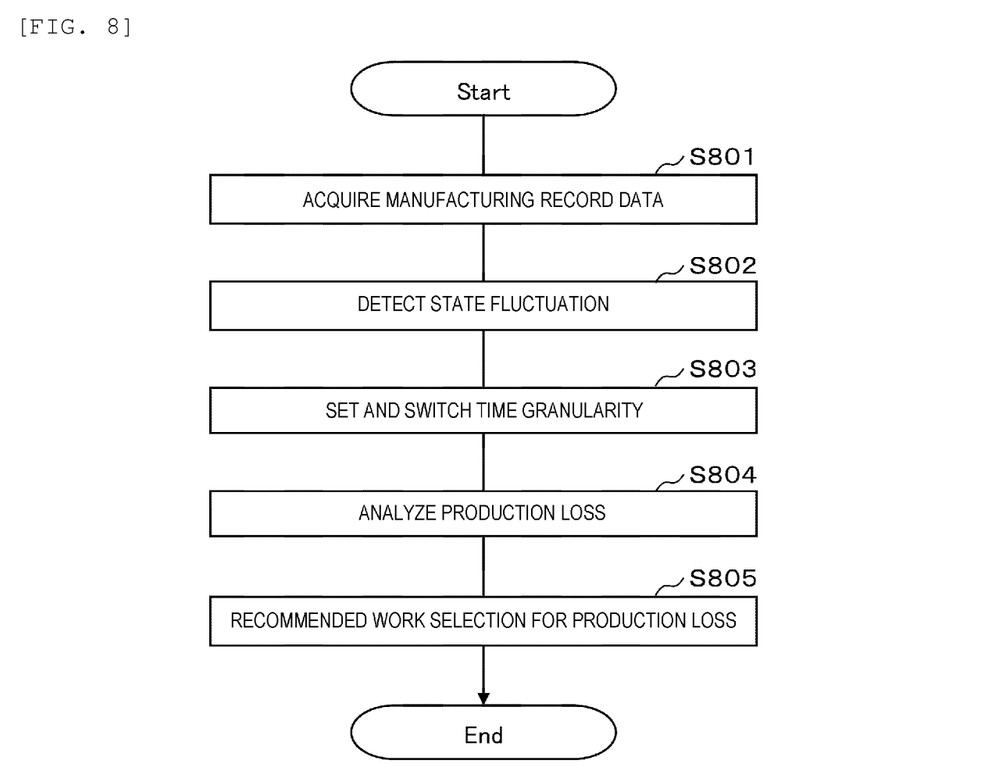
FIG. 8 is a flowchart showing a processing procedure of a processing (recommended work presentation processing) performed in the present system.

FIG. 8 is a flowchart showing a processing procedure of processing (recommended work presentation processing) performed in the present system. As shown in FIG. 8, first, the data extraction unit 131 acquires the 4M data from the target device that outputs the 4M data, acquires the manufacturing record data as shown in FIG. 3, and stores the data in the 4M data storage unit 141 (S801).

Subsequently, the time scale setting unit 132 determines whether it is detected that the fluctuation of the acquired 4M data has occurred more than a certain level with reference to the time scale data 1421 shown in FIG. 4. Then, the time scale setting unit 132 sets or switches the time scale of the 4M data acquired by the data extraction unit 131 when it is determined that the state fluctuation in the process of producing the target device has occurred more than a certain level (S802, S803).

Figure 9:
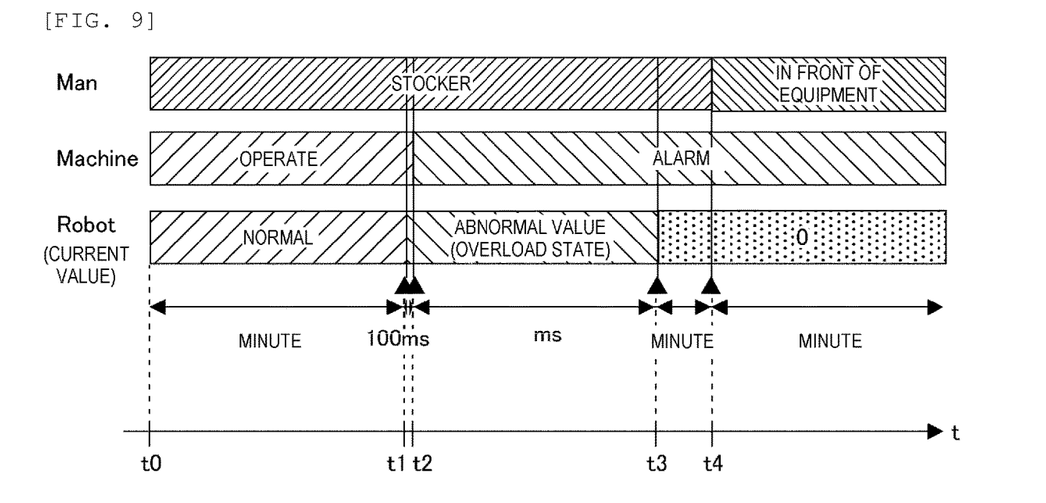
FIG. 9 is a diagram showing an example of concept of setting and switching of a time scale in S802 and S803.

Here, the concept of setting and switching the time scale in S802 and S803 will be described. FIG. 9 is a diagram showing an example of the concept of setting and switching the time scale in S802 and S803. FIG. 9 illustrates the Man data 1412 and the Machine data 1411 (in FIG. 9, two data of Machine data and Robot data), among the 4M data. As shown in FIG. 9, from a certain time t0 to a time t1, in the Man data 1412 and the Machine data 1411 acquired by the data extraction unit 131, the state fluctuation in the process of producing the target device is not detected. Therefore, the data extraction unit 131 acquires the 4M data from the target device in minutes, which is the time scale (for example, the default time scale) when the above state fluctuation is not detected, with reference to the time scale data 1421.

Then, the time scale setting unit 132 determines whether the data extraction unit 131 has acquired 4M data (for example, current value>0.5) that satisfies the conditions for detecting the state fluctuation with reference to the analysis model data 1431. The time scale setting unit 132 switches the time scale of the 4M data extracted by the data extraction unit 131 to a smaller time scale than before, and updates the value to the time scale of the time scale data 1421, when it is determined that the data extraction unit 131 has acquired the 4M data that satisfies the conditions for detecting the state fluctuation. In FIG. 9, since the state fluctuation describe above is detected at a certain time t1, the time scale setting unit 132 updates the time scale in a minute, which is a time scale when the state fluctuation is detected (for example, time scale less than the default time scale), from the time t1 to a time t2. Then, the data extraction unit 131 starts to acquire 4M data from the target device with the time scale when the state fluctuation is detected (100 ms in FIG. 9) with reference to the updated time scale data 1421.

After that, from a time t2 to a time t3, the data extraction unit 131 acquires 4M data from the target device with the updated time scale. Then, when it is determined that the data extraction unit 131 has acquired 4M data (for example, current value≤0.5) that does not satisfy the conditions for detecting the state fluctuation in the process of producing the target device, the time scale setting unit 132 returns the time scale of the 4M data extracted by the data extraction unit 131 from the switched time scale to the default time scale, and sets the value to the time scale of the time scale data 1421. In FIG. 9, since the state fluctuation is not detected at a certain time t3, the time scale setting unit 132 sets the time scale in minutes, which is the time scale (for example, the default time scale) when the state fluctuation is not detected from the time t3 to a time t4. Then, the data extraction unit 131 starts to acquire 4M data from the target device with the time scale (in minutes in FIG. 9) when the state fluctuation is not detected with reference to the set time scale data 1421. After that, as in the case described above, when the state fluctuation is detected, the data extraction unit 131 acquires 4M data from the target device with the time scale smaller than that in a normal time, and when the state fluctuation is not detected, returns to a time scale in the normal time and acquires 4M data from the target device.

Returning to FIG. 8, the loss analysis calculation unit 133 analyzes the production loss factor of the target device that outputs the 4M data in which the time scale described above is switched with reference to the analysis model data 1431 (S804). For example, the loss analysis calculation unit 133 reads the production loss factor corresponding to the 4M data that satisfies the conditions for detecting the state fluctuation in the analysis model data 1431, determines that the state fluctuation is due to the read production loss factor, and outputs the loss analysis result data 1441 as shown in FIG. 6, including the production loss factor and the loss ID. The loss analysis calculation unit 133 sets, for example, the start time and end time of the time scale data 1421 as the start time and end time of the loss analysis result data 1441.

The recommended work selection unit 134 selects the recommended work according to the analysis result of the production loss and presents the result (S805) with reference to the recommended work data 1451 shown in FIG. 7. For example, the recommended work selection unit 134 reads the recommended work corresponding to the same loss ID and production loss factor as the loss ID and production loss factor of the loss analysis result data 1441 from the recommended work data 1451 shown in FIG. 7, and outputs the result to the display control unit 12. The display control unit 12 displays the output result described above to the input and output unit 11.

Figure 10:
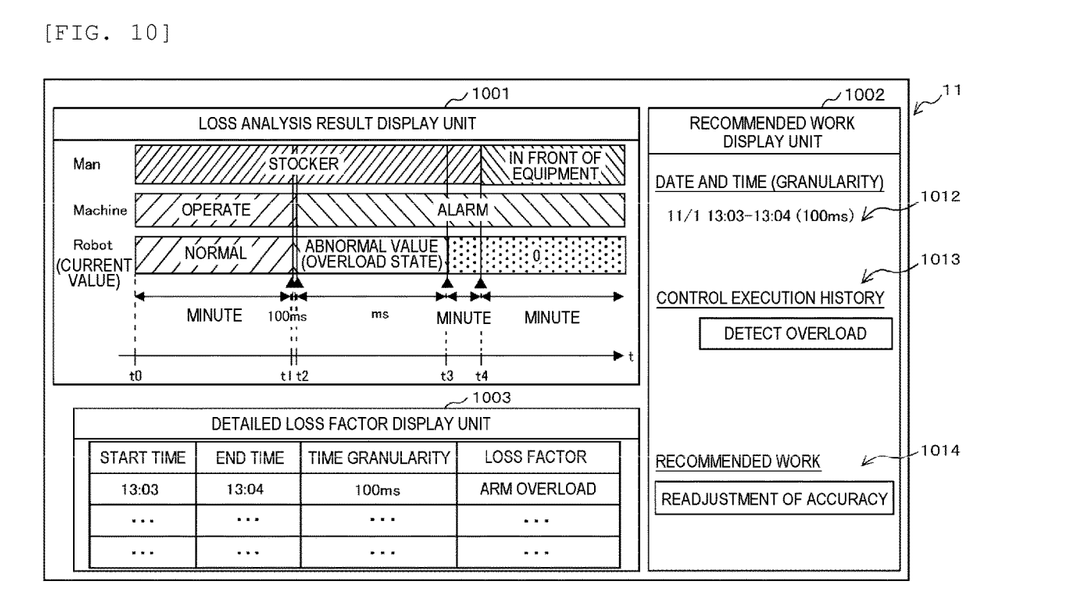
FIG. 10 is a diagram showing an example of a screen (analysis result and recommended work display screen) displayed by a display control unit on an input and output unit.

FIG. 10 is a diagram showing an example of a screen (a display screen of the analysis result and the recommended work) displayed on the input and output unit 11 by the display control unit 12. As shown in FIG. 10, the display control unit 12 outputs a screen including a loss analysis result display unit 1001, a recommended work display unit 1002, and a detailed loss factor display unit 1003 as the display screen of the analysis result and the recommended work.

The loss analysis result display unit 1001 includes the same contents as the conceptual diagram of the setting and switching of the time scale shown in FIG. 9. The display control unit 12 displays, for example, 4M data in time series, with a vertical axis representing a name of each 4M data and a horizontal axis representing a time, and displays the set or switched time scale on the screen, with reference to each 4M data shown in FIG. 3, the time scale data 1421 shown in FIG. 4, and the analysis model data 1431 shown in FIG. 5.

In addition, the recommended work display unit 1002 includes a date and time and time scale column 1012 showing the date and time and the time scale when the time scale is switched due to the fluctuation of the 4M data, a control execution history column 1013 showing the production loss factor when the fluctuation occurs, and a recommended work column 1014 showing the recommended work for the production loss which is the factor. The display control unit 12 reads the time scale data 1421 shown in FIG. 4, and displays the start time and end time when the fluctuation of the 4M data has occurred, and the time scale at that time in the date and time and time scale column 1012.

The display control unit 12 reads the analysis model data 1431 shown in FIG. 5 or the loss analysis result data 1441 shown in FIG. 6, and displays the production loss factor at the start time and end time when the fluctuation occurs in the control execution history column 1013. The display control unit 12 further reads the recommended work data 1451 shown in FIG. 7, and displays the recommended work corresponding to the production loss factor displayed in the control execution history column 1013 described above in the recommended work column 1014.

In addition, the detailed loss factor display unit 1003 includes all or a part of the contents of the loss analysis result data 1441 shown in FIG. 6 and the time scale data 1421 shown in FIG. 4. Since the display screen of the analysis result and recommended work as shown in FIG. 10 is presented to the user, the user can easily grasp the production loss factor at that time even when the combination of the manufacturing record data having different time scale is analyzed, or the state fluctuation is detected in any of 4M data. In addition, the recommended work when the production loss factor occurs can be easily confirmed.

Therefore, since the present system includes the time scale setting unit 132 that switches the time scale of the 4M data to the time scale according to the state fluctuation when the 4M data having different time scales (for example, each 4M data shown in FIG. 3) acquired from the target device outputting the 4M data contains data that satisfy the conditions for detecting the state fluctuation (for example, the conditions determined in the analysis model data 1431), the loss analysis calculation unit 133 that analyzes the production loss factor by using the analysis model data 1431 in which the production loss factor of the target device when the conditions are satisfied is determined, and the recommended work selection unit 134 that selects the recommended work when the production loss factor occurs from one or a plurality of recommended works by using the recommended work data stored in association with the production loss factor (for example, the recommended work data 1451), it is possible to instruct the improvement of work according to the production loss factor when the state fluctuation occurs based on the analysis result obtained by combining data having different scales.

In addition, since the display control unit 12 that outputs a screen including the 4M data, the time scale after switching, the production loss factor, and the recommended work to the display unit is provided, the user can grasp the information at a glance.

In addition, since the recommended work selection unit selects the recommended work from the recommended work data according to the time scale, the recommended work according to the time scale can be presented to the user.

In addition, when the time scale setting unit does not include the data that satisfies the conditions for detecting the state fluctuation, the time scale switched according to the state fluctuation is returned to the time scale before detecting the state fluctuation, and as a result, it is not necessary to analyze data with fine time scales, and it is possible to suppress an increase in the amount of data and the amount of calculation.

In the related art, when analyzing a combination of the manufacturing record data having different time scales, the amount of data would be enormous if the analysis is performed according to the minimum time scale among 4M data, and it is not possible to perform the calculation in reality, but according to the present system, as described above, it is possible to analyze the loss factor by setting the required time scale for each data. For example, it is possible to set the time scale required for analysis for a combination of manufacturing data, perform the analysis by combining data having different time scales, and set or change improvement measures according to the time scale at the time of the analysis. Thus, the time scale for the data combination is switched to save and analyze the data so as to pick up the detailed data only before and after data fluctuation (change in the state) occurs, and the work instruction (display) for equipment control/work is changed according to a controllable time scale, so that it is possible to identify the root cause of the production loss, which cannot be realized by combining techniques of the related art, and to recommend the measures necessary to improve productivity.

Although the invention has been described in detail based on the embodiment, the invention is not limited to the embodiments described above, and various modifications can be made without departing from the scope of the invention.

REFERENCE SIGN LIST

10 productivity improvement support system
11 input and output unit
12 display control unit
121 loss analysis result display control unit
122 recommended work display control unit
13 control unit
131 data extraction unit
132 time scale setting unit
133 loss analysis calculation unit
134 recommended work selection unit
14 storage unit
141 4M data storage unit
1411 Machine data
1412 Man data
1413 Material data
1414 Method data
142 time scale data storage unit
1421 time scale data
143 analysis model data storage unit
1431 analysis model data
144 loss analysis result data storage unit
1441 loss analysis result data
145 recommended work data storage unit
1451 recommended work data

The invention claimed is:

1. A productivity improvement support system, comprising:
a robot;
a machine controller that controls a machine used in manufacturing;
a memory;
a processor coupled to the robot and the machine controller via a network, the memory storing instructions that when executed by the processor configure the processor to:
store time scale data which includes a plurality of group identifications (ID), each group ID identifying at least two data groups, and a time scale for the at least two groups, and a start time and an end time for each group ID, the time scale among at least two of the plurality of group IDs being different,
store analysis model data, which defines, for each of a plurality of loss IDs, a plurality of conditions for detecting a state change of the robot and/or the machine controller and an associated production loss factor, the plurality of conditions include a state of the machine, a state of the robot, a material quality and a process ID of the manufacturing,
store a plurality of predetermined recommended actions which are respectively stored in association with the loss IDs,
acquire first data from the robot and the machine controller according to the time scale based on the stored time scale data,
determine whether the acquired first data includes data that satisfies each of the conditions for detecting the state change for each of the plurality of loss IDs, and upon determining the first acquired data includes data that satisfies each of the conditions of a loss ID, change the time scale based on the stored time scale data to an updated time scale having units of time that are smaller than units of time of the time scale before the change of the time scale,
determine the loss factor based on the loss ID having the conditions satisfied by the data of the acquired data, and determine a recommended action based on the determined loss factor and the stored plurality of predetermined recommended actions.

2. The productivity improvement support system according to claim 1, wherein the processor is configured to:
display the determined recommended action, the determined loss factor and loss analysis result information which is a graphic indicating the acquired first data in time series with a vertical axis representing the acquired data for each of the robot and machine controller, respective names of the robot and the machine controller and a horizontal axis representing a time, and the updated time scale on a display.

3. The productivity improvement support system according to claim 1, wherein the processor is configured to:
determine the recommended action according to the time scale.

4. The productivity improvement support system according to claim 1, wherein the processor is configured to:
acquire second data from the robot and the machine controller according to the updated time scale based on the stored time scale data, and
determine whether the acquired second data includes data that satisfies each of the conditions for detecting the state change for each of the plurality of loss IDs, and upon determining the second acquired data does not include data that satisfies each of the conditions of a loss ID, change the time scale from the updated time scale to the time scale from before the change of the time scale.

5. A productivity improvement support method, of a manufacturing system that includes a robot and a machine controller for a machine, which is performed by a computer, the method comprising:
storing time scale data which includes a plurality of group identifications (ID), each group ID identifying at least two data groups, and a time scale for the at least two groups, and a start time and an end time for each group ID, the time scale among at least two of the plurality of group IDs being different;
store analysis model data, which defines, for each of a plurality of loss IDs, a plurality of conditions for detecting a state change of the robot and/or the machine controller and an associated production loss factor, the plurality of conditions include a state of the machine, a state of the robot, a material quality and a process ID of the manufacturing;
store a plurality of predetermined recommended actions which are respectively stored in association with the loss IDs;
acquire first data from the robot and the machine controller according to the time scale based on the stored time scale data;
determining whether the acquired first data includes data that satisfies each of the conditions for detecting the state change for each of the plurality of loss IDs, and upon determining the first acquired data includes data that satisfies each of the conditions of a loss ID, change the time scale based on the stored time scale data to an updated time scale having units of time that are smaller than units of time of the time scale before the change of the time scale;
determining the loss factor based on the loss ID having the conditions satisfied by the data of the acquired data; and
determining a recommended action based on the determined loss factor and the stored plurality of predetermined recommended actions.

6. The productivity improvement support method according to claim 5, further comprising:
displaying the determined recommended action, the determined loss factor and loss analysis result information which is a graphic indicating the acquired first data in time series with a vertical axis representing the acquired data for each of the robot and machine controller, respective names of the robot and the machine controller and a horizontal axis representing a time, and the updated time granularity scale on a display.

7. The productivity improvement support method according to claim 5, further comprising:
determining the recommended action according to the time scale.

8. The productivity improvement support method according to claim 5, the method further comprising:
acquiring second data from the robot and the machine controller according to the updated time scale based on the stored time scale data; and
determining whether the acquired second data includes data that satisfies each of the conditions for detecting the state change for each of the plurality of loss IDs, and upon determining the second acquired data does not include data that satisfies each of the conditions of a loss ID, change the time scale from the updated time scale to the time scale from before the change of the time scale.

* * * * *